United States Patent [19]

Orain

[11] 4,421,196
[45] Dec. 20, 1983

[54] HOMOKINETIC TRANSMISSION JOINT IN PARTICULAR FOR THE DRIVING WHEEL OF A FRONT WHEEL DRIVE VEHICLE

[75] Inventor: Michel A. Orain, Conflans Ste Honorine, France

[73] Assignee: Glaenzer Spicer, Poissy, France

[21] Appl. No.: 328,443

[22] Filed: Dec. 7, 1981

[30] Foreign Application Priority Data

Dec. 19, 1980 [FR] France ............... 80 27027

[51] Int. Cl.³ .............................. B60K 17/30
[52] U.S. Cl. .................... 180/257; 464/111; 464/115; 464/905
[58] Field of Search .............. 180/254, 257, 258; 464/111, 115, 124, 905

[56] References Cited

U.S. PATENT DOCUMENTS 2,551,779  5/1951  Wingquist ............ 464/905
2,981,084  4/1961  Glover ................. 464/124
4,273,209  6/1981  Orain .................. 464/111

FOREIGN PATENT DOCUMENTS 1205519  2/1960  France .

Primary Examiner—John A. Pekar
Assistant Examiner—D. Lynn Fugate
Attorney, Agent, or Firm—Wenderoth, Lind & Ponack

[57] ABSTRACT

The joint comprises two opposed forks which are angularly offset from each other at 60° and are axially extended by nose portions which are internally spherical. These nose portions swivel on a ring through which extends with a large clearance a shaft section which carries at each end a tripod element associated with one of the forks. The ring is maintained roughly in the bisecting plane of the joint by contact or quasi-contact with the rollers of the two tripod elements. In this way it is possible to produce steering road wheel homokinetic joints which are capable of operating at angles of 50° and more with no reduction in their transmitting capacity.

8 Claims, 7 Drawing Figures

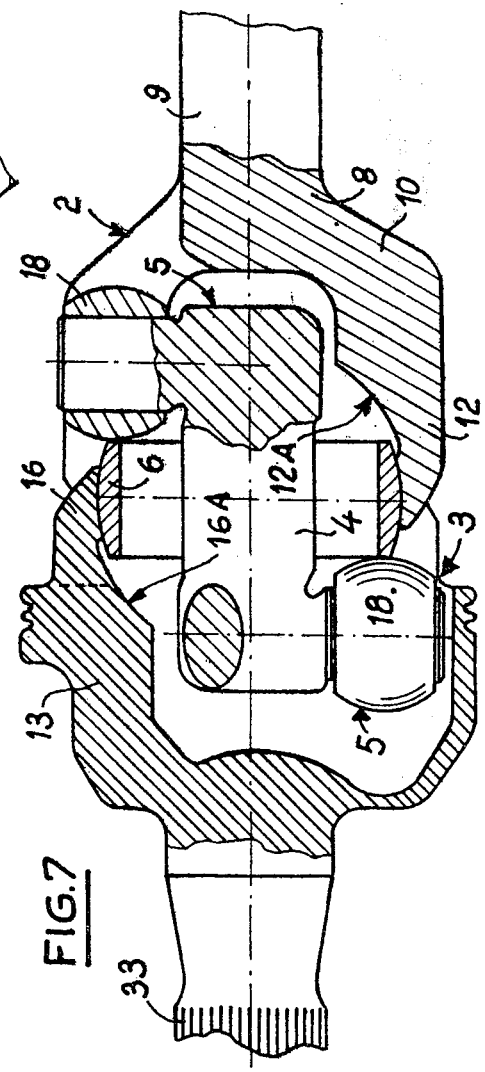
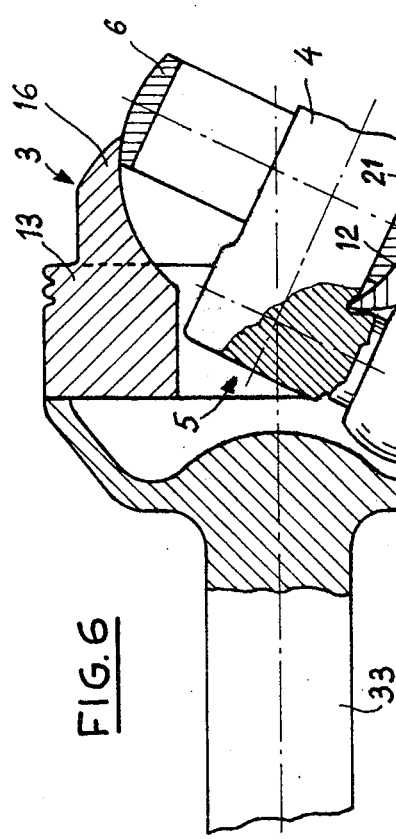
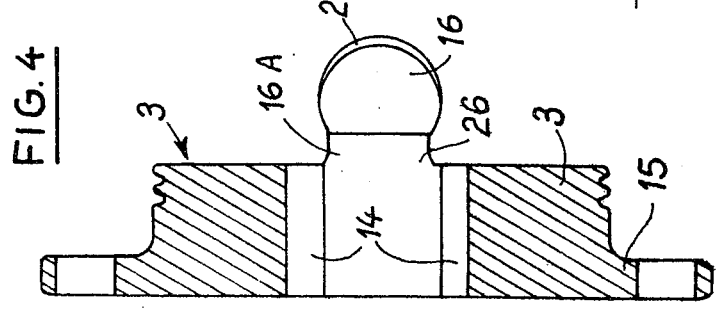

HOMOKINETIC TRANSMISSION JOINT IN PARTICULAR FOR THE DRIVING WHEEL OF A FRONT WHEEL DRIVE VEHICLE

DESCRIPTION

BACKGROUND OF THE INVENTION

The present invention relates to homokinetic power transmitting joints for in particular driving the front steering wheels of front wheel drive vehicles of the type comprising a shaft section carrying at each end a tripod element, the two tripod elements being angularly offset at 60°, and two forks each defining three pairs of runways having a circular section, each tripod element comprising three arms each carrying, rotatably and slidable mounted thereon, a spherical roller disposed in a pair of runways.

It is known that the driving and steering wheels of front wheel drive vehicles are driven through homokinetic joints disposed in the region of the wheel pivot near to or within the wheel hub. The mechanisms of these joints are usually considered to be a fragile point of front wheel drive vehicles, this being all the more true as their maximum operating angle is greater. Indeed, when the maximum angle of operation increases, the stresses in the components of the mechanism rapidly increase with associated increase in friction and in the tendency to jam and seize, and the component parts, and in particular the tulip or fork element, must be reduced in size and apertured in order to avoid interference between the various elements of the joint, which obviously weakens them.

Now, these joints are parts on which the safety of the vehicle depends, and the seizure or the fracture thereof may result in accidents. Consequently, up to the present time, either the angularity of these joints have been limited to between 40° and 45°, or the joints have been considerably overdimensioned. However, the second solution is expensive and, owing to the greater overall size, results in a relative reduction in the steering angle of the wheel, which is contrary to the desired result.

French Pat. No. 1 205 519 discloses a homokinetic joint which is substantially of the aforementioned type. However, this joint is unsuitable as a wheel joint owing to the absence of simple and light means for axially interconnecting the two forks while allowing them to swivel with respect to each other.

SUMMARY OF THE INVENTION

An object of the invention is to provide a homokinetic joint which is capable of conserving at operating angles of 50° and more, substantially the same strength as when it is straight, notwithstanding a small radial overall size and great constructional simplicity.

The invention therefore provides a homokinetic joint of the aforementioned type, wherein each fork is axially extended, between its pairs of runways, by three internally spherical nose portions, the six nose portions co-operating with the spherical outer surface of a ring which surrounds with clearance the shaft section between the two tripod elements, and the six rollers are substantially tangent to the two end surfaces of the ring when the two parts of the joints are in axial alignment, ie. when the joint is straight.

According to another advantageous feature of the invention, the outer surface of the nose portions corresponds roughly to the interior envelope of the rollers when the joint rotates with a variable break angle, so that the nose portions axially position the shaft section-tripod elements assembly when the joint is operating at an angle.

One of the forks may in particular be rigid with a suspended transmission shaft and the other rigid with a hub or a wheel stubaxle.

BRIEF DESCRIPTION OF THE DRAWINGS

The invention will be explained in more detail hereinafter with reference to the accompanying drawings which show only four embodiments. In the drawings:

FIG. 4 is a partial sectional view of a modification taken on line 4—4 of FIG. 3;

FIG. 6 is a partial view of another modification of the application of the same joint operating at maximum break angle; and FIG. 7 is a view of a modification of the application shown in FIG. 6.

DETAILED DESCRIPTION OF THE INVENTION

Figure 1:
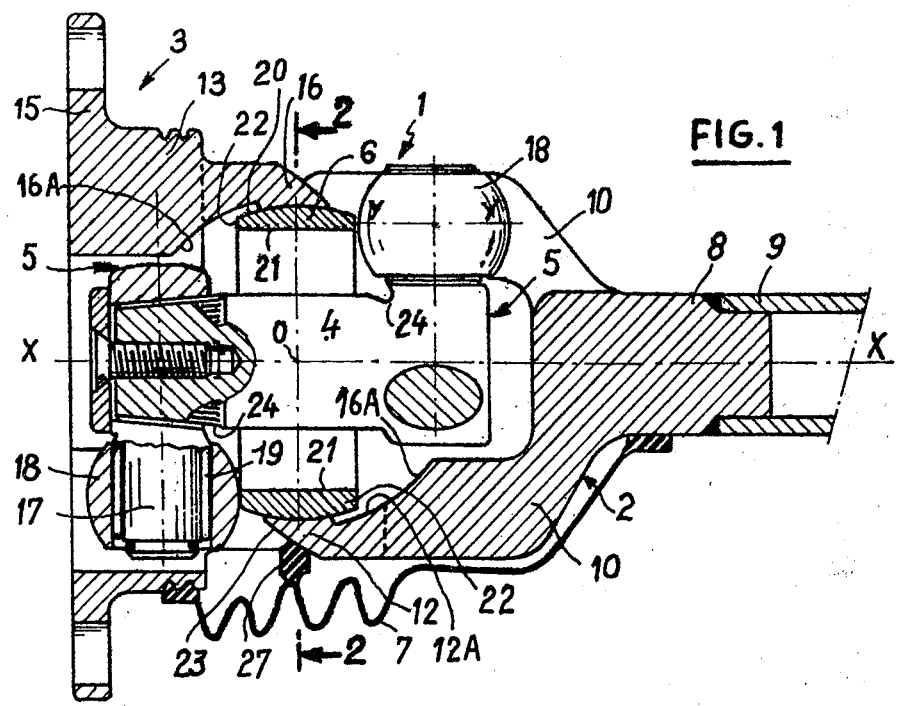
FIG. 1 is a longitudinal sectional view of a homokinetic joint according to the invention.
Figure 2:
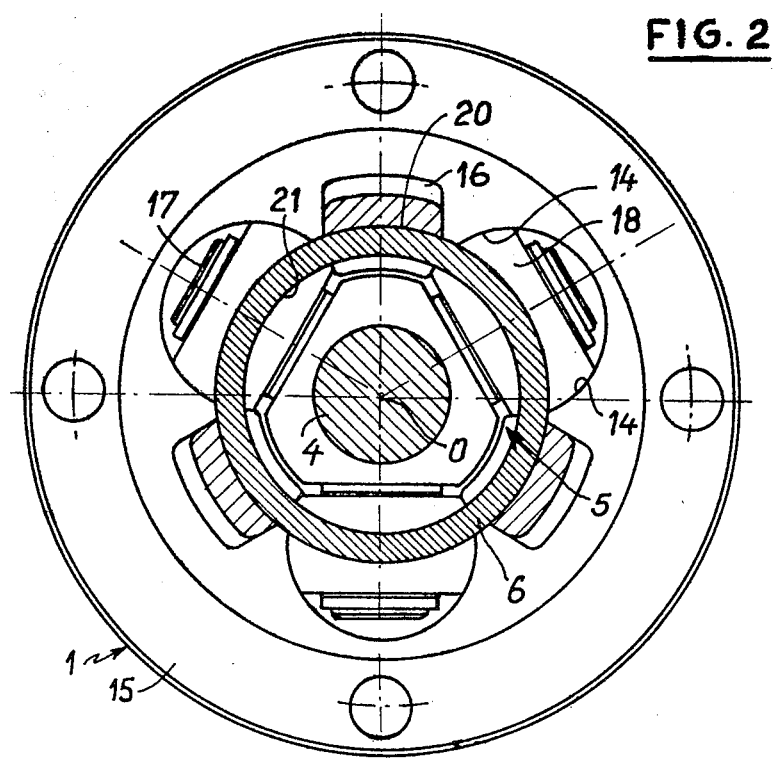
FIG. 2 is a cross-sectional view taken on line 2—2 of FIG. 1.
Figure 3:
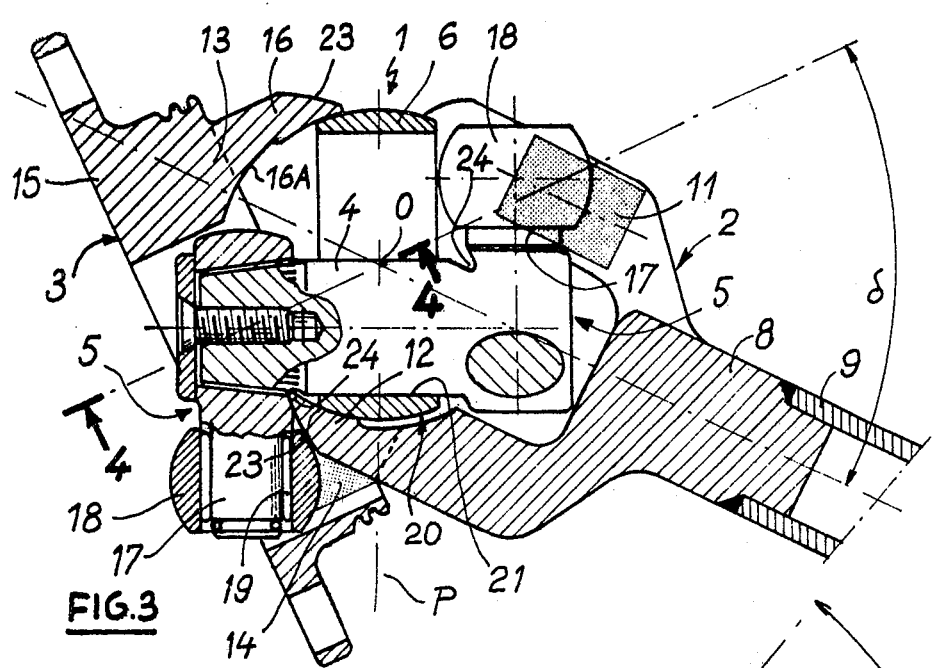
FIG. 3 is a view similar to FIG. 1 of the joint with a maximum break angle.

The homokinetic joint 1 shown in FIGS. 1 to 3 comprises two female elements or forks 2, 3, a cylindrical shaft section 4 carrying at each end a tripod element 5, an externally spherical and internally cylindrical ring 6, and a bellows of rubber 7. In order to facilitate the description, it will be assumed that the joint 1 is straight, ie. the parts 2 and 3 are aligned on a horizontal axis X—X.

The driving fork 2 has the shape of a tulip. It comprises a body 8 adapted to be rendered rigid with the suspended shaft 9 of a lateral transmission of a front wheel drive vehicle. Connected to this body are three petal portions 10 which are parallel to the axis X—X and define therebetween three pairs of runways 11 (FIG. 3). The two runways of the same pair are in confronting relation and are located on the same cylinder which has an axis Y—Y parallel to the axis X—X. The three axes Y—Y are angularly spaced 120° apart from each other. Each petal portion 10 is axially extended by a nose portion 12.

The fork 3 mainly comprises an annular body 13 in which are formed three cavities having a circular section parallel to the axis X—X and spaced 120° apart and defining three pairs of runways 14 similar to the runways 11 of the tulip element 2. An outer flange 15 extends radially from one end of the body 13 and three nose portions 16 extend axially from the opposed end between the cavities 14 (FIG. 2).

Each tripod element 5 comprises three radial arms 17 arranged at 120° apart (FIG. 2) and on each of which is rotatably and slidably mounted an externally spherical roller 18, for example, as illustrated, with interposition of a needle bearing 19 (FIGS. 1 and 3). The two tripod elements are angularly offset 60° from each other and each of the six rollers 18 is disposed in one of the pairs of runways 11, 14. The arms 17 may constitute an integral part of the shaft section 4 or be fixed on the latter by a centre sleeve.

The six nose portions 12 and 16 interpenetrate. The inner surfaces are spherical and cooperate with the outer spherical surface 20 of the ring 6 whose inner cylindrical bore 21 has a diameter which is much greater than the outside diameter of the shaft section 4 and surrounds the latter between the two tripod elements 5.

As can be seen in FIG. 1, when the joint is straight, the six rollers 18 are tangent to the end surfaces 22 of the ring 6. Thus, the assembly 5-4-5 is positioned axially by the ring 6 and, for its part, orients the latter in a position parallel to the shaft 4.

When the joint is broken, the axial positioning of the assembly 5-4-5 is ensured by the successive contact of the rollers 18 with the outer surface 23 of the confronting nose portions 12, 16, the profile of this surface 23 corresponding to the interior envelope of the outer profile of the rollers 18 when the joint rotates at a variable break angle. Further, the rollers 18 are so dimensioned that at least a part thereof remain in the neighbourhood of the edges of the ring 6, irrespective of the break angle of the joint, so that the ring 6 has at the most a small freedom of angular movement with respect to the assembly 5-4-5. A geometric analysis shows that the ring 6 thus remains substantially in the bisecting plane P of the joint and the axes of the shaft 9 and the flange 15 remain concurrent at centre 0 of ring 6. Thus there is no danger of the ring 6 leaving the nose portions 12, 16 by a tilting thereof.

Note that the profile indicated for the surfaces 23 is that which imparts maximum strength to the nose portions 12 and 16.

The maximum break angle δ of the joint 1 (FIG. 3) is obtained when the shaft section 4 reaches a position in which it is in tangential contact with the bore 21 of the ring 6, which constitutes a continuous safety limit when there is a tendency to make the joint operate beyond its geometric angular capacity. In order to enable this position to be reached, a cavity 24 may be provided at the base of each arm 17 in the sleeve which carries these arms, or in the shaft section 4 itself, so as to receive the end of the nose portion 12, 16 located in the same radial plane in the assembly. In this position, the rollers 18 reach the end of their runways 11, 14.

By way of a modification, in order to avoid weakening the shaft 4, the end of the nose portions 12, 16 may be chamfered as shown at 25 in FIG. 4. This FIG. 4 shows that the nose portions have roughly in plan a shape of three-quarters of a circle connected to the rest of the tulip element by an attachment region 26 which has roughly parallel edges. This shape is designed to give the nose portions the maximum area of bearing on the ring 6 without producing interference in the course of the movements of the joint, bearing in mind the elastic deformations under extreme torque conditions. Each nose portion 12, 16 is moreover dimensioned so as to be capable of penetrating the pair of runways 14, 11 of the opposed fork 3, 2 located in the same radial plane in the course of the rotation of the joint in a non-straight condition.

Preferably, the grinding of the inner spherical surfaces of the nose portions 12 and 16 is limited solely to the effective operating regions. For this purpose, recesses 12A, 16A may be provided at the root of these nose portions beyond this effective operating region as shown in FIGS. 1, 3 and 4.

The whole of the joint is protected by the bellows 7 which retains the lubricant. Only one half has been shown in FIG. 1 by way of example and the bellows has been omitted in the other Figures in order to render them more clear. One end of this bellows surrounds the tulip element 2 and is fixed to the body 9 and its other end is fixed to the periphery of the body 13 of the fork 3 close to the base of the nose portions 16 of this fork. Roughly midway along its length the bellows 7 has an inner bead 27 in one piece therewith which bears against the periphery of the nose portions 12 and 16 and prevents these nose portions from coming into contact with the pleats of the bellows.

Figure 5:
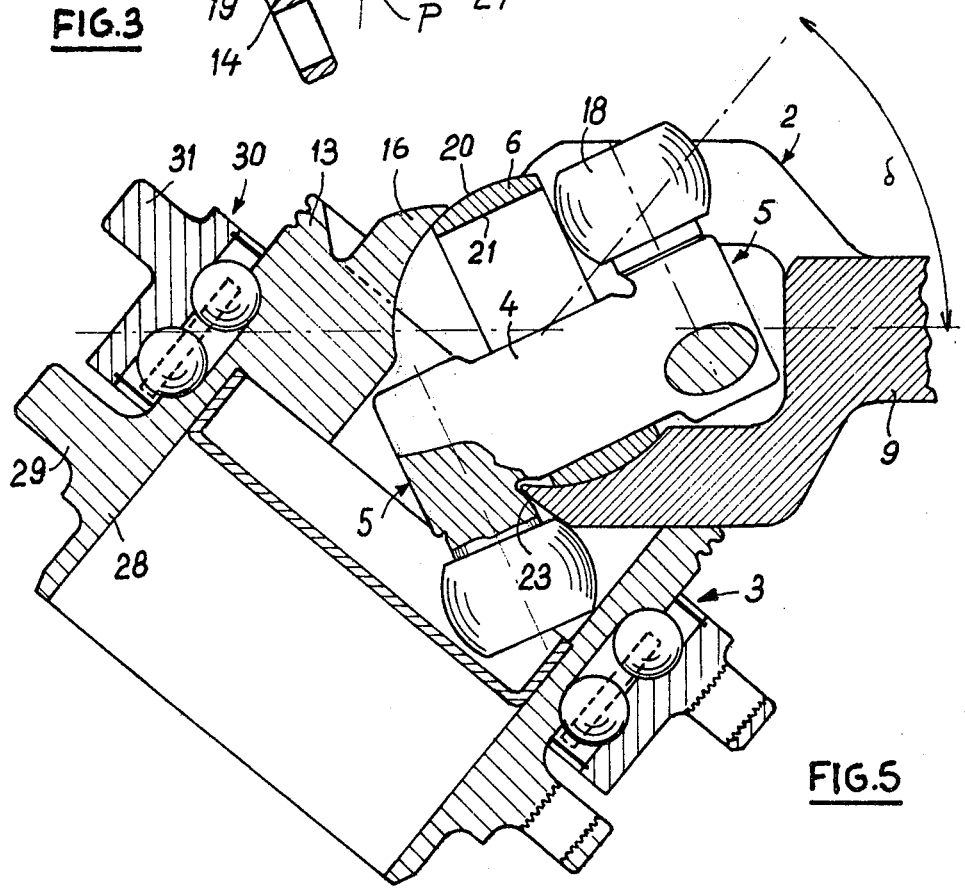
FIG. 5 is a view similar to FIG. 3 of a modification of the application of the joint of FIGS. 1 to 3.

The flange 15 is adapted to be fixed to a wheel hub. By way of a modification (FIG. 5), the fork 3 may be an integral part of the hub 28 which has a flange 29 for securing the wheel and forms the inner element of a double ball bearing 30 whose outer element 31 is adapted to be fixed to a wheel pivot.

In another modification of the application of the joint (FIG. 6), the flange 15 is eliminated and the body 13 is welded to a cup 32 rigid with a wheel stub axle 33. By way of a modification, as shown in FIG. 7, the body 13 may be an integral part of the stub axle 33.

It will be understood that generally it is possible to contemplate any suitable type of shape and connection between the two forks and the driven and driving elements with which they are rigid. In particular the joint may comprise two forks having petal portions of the type of the tulip 2 or two forks without petal portions of the type of the fork 3. The joint of the invention may operate without a reduction in its strength up to angles δ which are at least equal to 50° (52° in the illustrated embodiments). Its structure is simple and strong, it is easy to produce and does not require precise fitting. It has a small radial overall size.

Having now described my invention what I claim as new and desire to secure by Letters Patent is:

1. In a homokinetic transmission joint, in particular for a driving wheel of a front wheel drive vehicle, said joint comprising a shaft section, a tripod element carried at each of opposite ends of the shaft section, the two tripod elements being angularly offset from each other at 60°, and two forks each defining three pairs of runways having a circular cross-sectional shape, each tripod element comprising three arms on each of which arms is rotatably mounted and displaceable longitudinally of the arm a spherical roller which is disposed in a corresponding pair of said runways; the improvement comprising for each fork three internally spherical nose portions which axially extend said each fork between the pairs of runways defined thereby, a ring which surrounds, with clearance, said shaft section between the two tripod elements and has an outer spherical surface, the six nose portions cooperating with said outer spherical surface of said ring, and the six rollers being substantially tangent to two end surfaces of said ring when the joint is straight.

2. A joint according to claim 1, wherein outer surfaces of the nose portions roughly correspond to an inner geometric envelope of the rollers when the joint rotates at a variable break angle, so that the nose portions axially position an assembly comprising the shaft section and tripod elements when the joint is operating at an angle.

3. A joint according to claim 1, wherein the rollers are positioned to maintain the ring substantially in a bisecting plane of the joint when the joint is not straight and operates at an angle and thus prevents said ring from disengaging the nose portions by a tilting movement of the ring.

4. A joint according to claim 1, 2 or 3, wherein the ring has a cylindrical inner surface and a free end of each nose portion has a chamfer adapted to come in contact with the shaft section when the shaft section becomes tangent to said inner cylindrical surface of the ring.

5. A joint according to any one of the claims 1 to 3, wherein the ring has a cylindrical inner surface and the shaft section comprises cavities for receiving a free end of each of said nose portions when the shaft section becomes tangent to said inner cylindrical surface of the ring.

6. A joint according to any one of the claims 1 to 3, comprising an elastic bellows which is fixed to the two forks, a median portion of said bellows being provided with an inner bead which bears against an outer surface of the forks.

7. A joint according to any one of the claims 1 to 3, wherein one of the forks is rigid with a suspended transmission shaft and the other fork is rigid with a wheel hub.

8. A joint according to any one of the claims 1 to 3, wherein one of the forks is rigid with a suspended transmission shaft and the other fork is rigid with a wheel stub-axle.

* * * * *